United States Patent [19]
Fujiwara

[11] Patent Number: 6,009,848
[45] Date of Patent: Jan. 4, 2000

[54] FUEL CONTROL SYSTEM FOR CYLINDER INJECTION TYPE INTERNAL COMBUSTION ENGINE

[75] Inventor: Toru Fujiwara, Tokyo, Japan

[73] Assignee: Mitsubishi Denki Kabushiki Kaisha, Tokyo, Japan

[21] Appl. No.: 09/347,234

[22] Filed: Jul. 2, 1999

Related U.S. Application Data

[63] Continuation of application No. 09/021,999, Feb. 11, 1998, Pat. No. 5,947,078.

[30] Foreign Application Priority Data

Sep. 9, 1997 [JP] Japan ................................ 9-244148

[51] Int. Cl.[7] .................................................. F02D 41/06
[52] U.S. Cl. ........................... 123/295; 123/300; 123/491
[58] Field of Search ..................... 123/295, 299, 123/300, 305, 478, 491; 60/284, 285

[56] References Cited

U.S. PATENT DOCUMENTS

| | | | |
|---|---|---|---|
| 4,955,339 | 9/1990 | Sasaki et al. | 123/300 X |
| 5,785,031 | 7/1998 | Akimoto et al. | 123/295 |

*Primary Examiner*—Tony M. Argenbright
*Attorney, Agent, or Firm*—Sughrue, Mion, Zinn, Macpeak & Seas, PLLC

[57] ABSTRACT

A cylinder injection type fuel control system for an internal combustion engine ensuring normal ignition and combustion of air fuel mixture while effectively utilizing two-stroke fuel injection includes sensors (1) for generating a variety of information concerning operation state of the internal combustion engine engine operation state detecting device (11) for detecting an engine operation state (D) on the basis of the various information and fuel injectors (2) disposed so as to inject fuel directly into a combustion chamber of each engine cylinder. An injection mode setting device (12A) selectively sets a fuel injection mode (M) to either a one-stroke fuel injection mode or a two-stroke fuel injection mode in dependence on the engine operation state. An injector driving device (13) drives the fuel injectors (2) in accordance with the selected fuel injection mode. An engine operation state information storing device (14) stores preceding engine operation state information as operation history information of the engine before current operation is started. The injection mode setting device (12A) selectively sets a current fuel injection mode in succession to the engine starting on the basis of the preceding engine operation state information (Dp). When the preceding engine operation state information does not satisfy a predetermined operating condition representing a sufficiently heated state of spark plug within the combustion chamber, the two-stroke fuel injection mode is inhibited from being validated.

14 Claims, 4 Drawing Sheets

FUEL CONTROL SYSTEM FOR CYLINDER INJECTION TYPE INTERNAL COMBUSTION ENGINE

This is a continuation of application Ser. No. 09/021,999 filed Feb. 11, 1998, now U.S. Pat. No. 5,947,078 the disclosure of which is incorporated herein by reference.

BACKGROUND OF THE INVENTION

1. Field of the Invention

The present invention relates to a fuel control system for a cylinder injection type internal combustion engine such as a gasoline engine for a motor vehicle in which fuel is directly injected into a combustion chamber defined within each cylinder of the engine. More particularly, the present invention is concerned with a fuel control system for a cylinder injection type (also referred to as the direct injection type) internal combustion engine which is capable of sustaining constantly a normal ignition or firing state while carrying out effectively a two-stroke fuel injection control in a compression stroke and an expansion stroke of the engine.

2. Description of Related Art

Heretofore, in the internal combustion engine such as a gasoline engine for a motor vehicle, the cylinder injection type fuel supply system has been widely adopted for injecting the fuel directly into the combustion chambers of the individual engine cylinders.

In general, the cylinder injection type fuel supply system for the internal combustion engine is advantageous in that effects such as mentioned below can be expected.

(1) Reduction in fuel cost

By injecting the fuel directly into the engine cylinder during the compression stroke of the internal combustion engine, a mass of the combustible air-fuel mixture tends to be formed around and in the vicinity of the spark plug to allow stratified combustion to take place. Thus, the fuel can undergo normal combustion for a given amount of the intake air with an air-fuel ratio smaller than the theoretical air fuel ratio.

By virtue of the stratified combustion mentioned above, the adverse influence of the exhaust gas recirculation (usually called EGR for short) to the combustion can be suppressed, enabling an increased amount of exhaust gas to be recirculated. Thus, the pumping loss is reduced, whereby the fuel cost can further be enhanced.

(2) Reduction of harmful gas components contained in exhaust gas

As is well known in the art, in the case of the conventional extra-cylinder injection type fuel supply system for the internal combustion engine in which the fuel is injected into an intake manifold rather than the engine cylinder, a part of the fuel injected is likely to adhere to intake valves and inner walls of the intake pipes/manifold before being charged into the engine cylinder, which is of course accompanied with some delay in the fuel supply to the engine cylinder. Consequently, in the engine starting operation at a low temperature where the fuel is difficult to gasify as well as in the transient engine operation in which high-speed response is required, harmful gas components such as CO, HC and others are likely to be discharged, giving rise to a problem.

By contrast, in the case of the cylinder injection type fuel supply system, essentially no delay can take place in the fuel supply or charge into the engine cylinder, ensuring thus high accuracy for the air-fuel ratio control, which in turn means that harmful gas components contained in the exhaust gas can be remarkably diminished owing to the ideal combustion.

Furthermore, by injecting the fuel into the engine cylinder during both the compression stroke and the expansion stroke which succeeds to the compression stroke, activation of the catalyst can be promoted even at a low temperature such as encountered in the engine starting operation, whereby the gas purification efficiency can be enhanced. By virtue of this feature, reduction of the harmful gas components contained in the exhaust gas can further be promoted.

A typical one of the cylinder injection type fuel supply systems for the internal combustion engine such as described above is disclosed, for example, in Japanese Unexamined Patent Application Publication No. 169834/1990 (JP-A-2-169834). More specifically, disclosed in the above publication is a two-stroke fuel injection type fuel supply system in which the fuel is injected into the engine cylinder in both the suction stroke and the compression stroke.

FIG. 3 is a block diagram showing schematically and generally a functional configuration of a conventional fuel control system for the cylinder injection type internal combustion engine known heretofore.

Referring to the figure, the internal combustion engine is provided with a variety of sensors for detecting various information used for controlling operation of the engine. More specifically, there are provided a key switch, an air flow sensor, a temperature sensor, a crank angle sensor (not shown) and others, which are collectively designated by a block 1. These sensors 1 serve for generating various signals concerning the key switch on/off information K, the cooling water temperature Wt, the engine rotation number or engine speed (rpm) (also referred to as the engine speed information) Ne and the intake air flow Q.

The various signals (carrying the information K, Wt, Ne and Q) are inputted to an electronic control unit (hereinafter referred to also as ECU in short) 10 to be used for arithmetically determining control parameters used in controlling the operation of the internal combustion engine. Parenthetically, the ECU 10 may be constituted by a microcomputer or microprocessor.

A fuel injector 2 electrically driven under the control of the ECU 10 is so disposed as to inject the fuel directly into a combustion chamber defined within each of the cylinders (not shown) of the engine.

The ECU 10 is composed of an engine operation state detecting means 11, an injection mode setting means 12 and an injector driving means 13.

The engine operation state detecting means 11 serves for detecting the operation state D of the internal combustion engine on the basis of the various information such as the key switch on/off information K, the cooling water temperature Wt, the engine rotation number (rpm) Ne and the intake air flow Q.

The injection mode setting means 12 serves for changing over the fuel injection modes M in dependence on the engine operation state D detected by the engine operation state detecting means 11. More specifically, the injection mode setting means 12 determines appropriately the fuel injection timings in a one-stroke fuel injection mode, e.g. in the suction stroke fuel injection or in the compression stroke fuel injection or alternatively the fuel injection timings in a two-stroke fuel injection mode in which the fuel injection is validated in both the suction stroke and the compression stroke, respectively.

On the other hand, the injector driving means 13 is designed to drive the fuel injector 2 at the fuel injection timing conforming to the fuel injection mode M validated or set by the injection mode setting means 12.

Next, referring to a flow chart shown in FIG. 4, description will be made of a fuel injection control operation carried out by the conventional fuel control system for the cylinder injection type engine shown in FIG. 3.

In the flow chart shown in FIG. 4, a routine including the steps S102 to S104 corresponds to the operation of the engine operation state detecting means 11, a routine including the step S105 to S107 corresponds to the operation of the injection mode setting means 12, and a routine including the steps S106 and S107 corresponds to the operation of the injector driving means 13.

At first, electric power supply to the ECU 10 is started in response to an engine starting operation (step S101). Then, the engine operation state detecting means 11 incorporated in the ECU 10 fetches the key switch on/off information K in the step S102, the cooling water temperature Wt in the step S103, and the engine rotation number Ne (engine speed information) in the step S104 to detect that the internal combustion engine is operating.

Subsequently, the fuel injection mode setting means 12 makes a decision as to whether or not the information indicating the engine operation state D sent from the engine operation state detecting means 11, e.g. the cooling water temperature Wt, is equal to or lower than a predetermined value Wr set in advance (step S105). Parenthetically, a value corresponding to the cold state of the engine (i.e., the state prevailing upon starting of the engine) may be selected as the predetermined value.

When it is decided in the step S105 that the cooling water temperature Wt does not exceed the predetermined value Wr (i.e., when the decision step S105 results in affirmation "YES"), this means that the catalytic medium is in the cold or inactive state. Accordingly, the two-stroke fuel injection is selected as the fuel injection mode M in the step S106.

On the other hand, when it is decided in the step S105 that the cooling water temperature Wt exceeds the predetermined value Wr (i.e., when the decision in the step S105 results in negation "NO"), this means that the catalytic medium is activated. Thus, the one-stroke fuel injection mode (i.e. compression stroke injection mode) is selected as the fuel injection mode M in the step S107.

In the fuel injection mode M selectively validated in the step S106 or S107, the injector driving means 13 drives correspondingly the fuel injector 2 for effectuating the fuel supply to the engine cylinder.

At this juncture, it is assumed that the two-stroke fuel injection effectuated in the step S106 represents a fuel injection control mode in which the fuel is injected in the two successive strokes of the compression stroke and the expansion stroke.

The two-stroke fuel injection mode is performed with a view to activating as early as possible the catalyst which is in the cold or inactive state when the cooling water temperature Wt of the engine is low, for thereby suppressing discharge of harmful components or substances contained in the exhaust gas.

Finally, it is decided in the step S108 whether or not the key switch on/off information K indicates that the key switch is in the off-state (opened state). When the answer of this decision step S108 is affirmative "YES", the processing returns to the start step S101. If otherwise (i.e., when the key switch is in the on or closed state), the step S102 is resumed for fetching or reading the key switch on/off information K.

As is apparent from the foregoing description, the fuel injection control operation in the steps S102 to S107 is repeatedly executed until the key switch information K indicates that the key switch is opened (until the decision step S108 results in "YES").

The conventional fuel control system for the cylinder injection type internal combustion engine described above however suffers a problem that when the engine in the low temperature state of the engine in which the cooling water temperature Wt is lower than the predetermined value Wr inclusive, the start and stop operation of the engine is repeated at a short time interval in the two-stroke fuel injection mode (step S106) in the state where the spark plug is not sufficiently heated.

In that case, the fuel injection repeated in every expansion stroke in the two-stroke fuel injection mode will result in contamination of the spark plug with deposition of soot, giving rise to the unwanted possibility that the normal ignition is impaired.

As will now be appreciated from the foregoing description, the conventional fuel control system for the cylinder injection type internal combustion engine suffers a problem that when the starting operation of the engine is repeated at a short time interval in the low temperature state of the engine in which the cooling water temperature Wt is lower than the predetermined value Wr inclusive, the fuel injection during the expansion stroke in the two-stroke fuel injection mode is performed repeatedly in the state where the spark plug is not sufficiently heated, which results in that the spark plug is deposited with soot, providing difficulty in realizing ignition and combustion of the fuel-air mixture with high efficiency and reliability.

SUMMARY OF THE INVENTION

In the light of the state of the art described above, it is an object of the present invention to provide a cylinder injection type fuel control system for an internal combustion engine which can ensure a normal ignition and combustion of the air fuel mixture while effectively making use of the two-stroke fuel injection.

To this end, it is taught by the present invention that the information of the preceding engine operation state is stored as history information for making a decision on the basis of the history information as to whether the spark plug was sufficiently heated so that raw fuel and soot as deposited have been burnt off after the start of the preceding engine operation, wherein the two-stroke fuel injection is validated only when the spark plug is regarded as having been sufficiently heated in the preceding engine operation while, if otherwise, the two-stroke fuel injection is validated.

In view of the above and other objects which will become apparent as the description proceeds, there is provided according to a general aspect of the present invention a fuel control system for a cylinder injection type internal combustion engine which includes a plurality of sensor means for generating a variety of information concerning the operation state of the internal combustion engine, the information including at least information concerning an on/off state of a key switch, a cooling water temperature and an engine rotation number, an engine operation state detecting means for detecting an engine operation state on the basis of the various information, fuel injector means disposed so as to inject fuel directly into a combustion chamber of each engine cylinder of the internal combustion engine, an injection mode setting means for setting selectively a fuel injection mode to either a one-stroke fuel injection mode or a two-stroke fuel injection mode in dependence on the engine operation state, injector driving means for driving the fuel injector means in accordance with the selected fuel injection mode, and an engine operation state information storing means for storing preceding engine operation state information as operation history information of the internal combustion engine before current engine operation is started. The injection mode setting means is so designed as to selectively set a current fuel injection mode in succession to the engine starting on the basis of the preceding engine operation state information, wherein when the preceding engine operation state information does not satisfy a predetermined operating condition representing a sufficiently heated state of spark plug within the combustion chamber, the two-stroke fuel injection mode is inhibited from being validated as the current fuel injection mode to be set in succession to the engine starting.

With the arrangement of the cylinder injection type fuel control system for the internal combustion engine described above, the normal ignition and combustion of the air fuel mixture can be ensured while effectively making use of the two-stroke fuel injection.

In a preferred mode for carrying out the invention, the one-stroke fuel injection may be performed in a compression stroke or alternatively in a suction stroke of the engine, while the two-stroke fuel injection may be realized by fuel injection in both a compression stroke and an expansion stroke of the engine, respectively. The fuel injection mode setting means can validate selectively the one-stroke fuel injection mode when the preceding engine operation state information does not satisfy the predetermined conditions, while validating the two-stroke fuel injection mode when the preceding engine operation state information satisfies the predetermined conditions.

In anther preferred mode for carrying out the invention, the preceding engine operation state information may include an engine rotation number.

In yet anther preferred mode for carrying out the invention, the preceding engine operation state information may include a maximum value of the engine rotation number.

In still anther preferred mode for carrying out the invention, the preceding engine operation state information may include an accumulated value of the engine rotation number.

In a further preferred mode for carrying out the invention, the various sensor information may include information concerning an intake air flow, while the preceding engine operation state information may include a volumetric efficiency of the internal combustion engine.

In yet a further preferred mode for carrying out the invention, the preceding engine operation state information may include a maximum value of the volumetric efficiency of the internal combustion engine.

In still a further preferred mode for carrying out the invention, the preceding engine operation state information may include an accumulated value of the volumetric efficiency of the internal combustion engine.

With the arrangement of the cylinder injection type fuel control system for the internal combustion engine as described above, the normal ignition and combustion of the air fuel mixture can be ensured while following effective validation of the two-stroke fuel injection.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
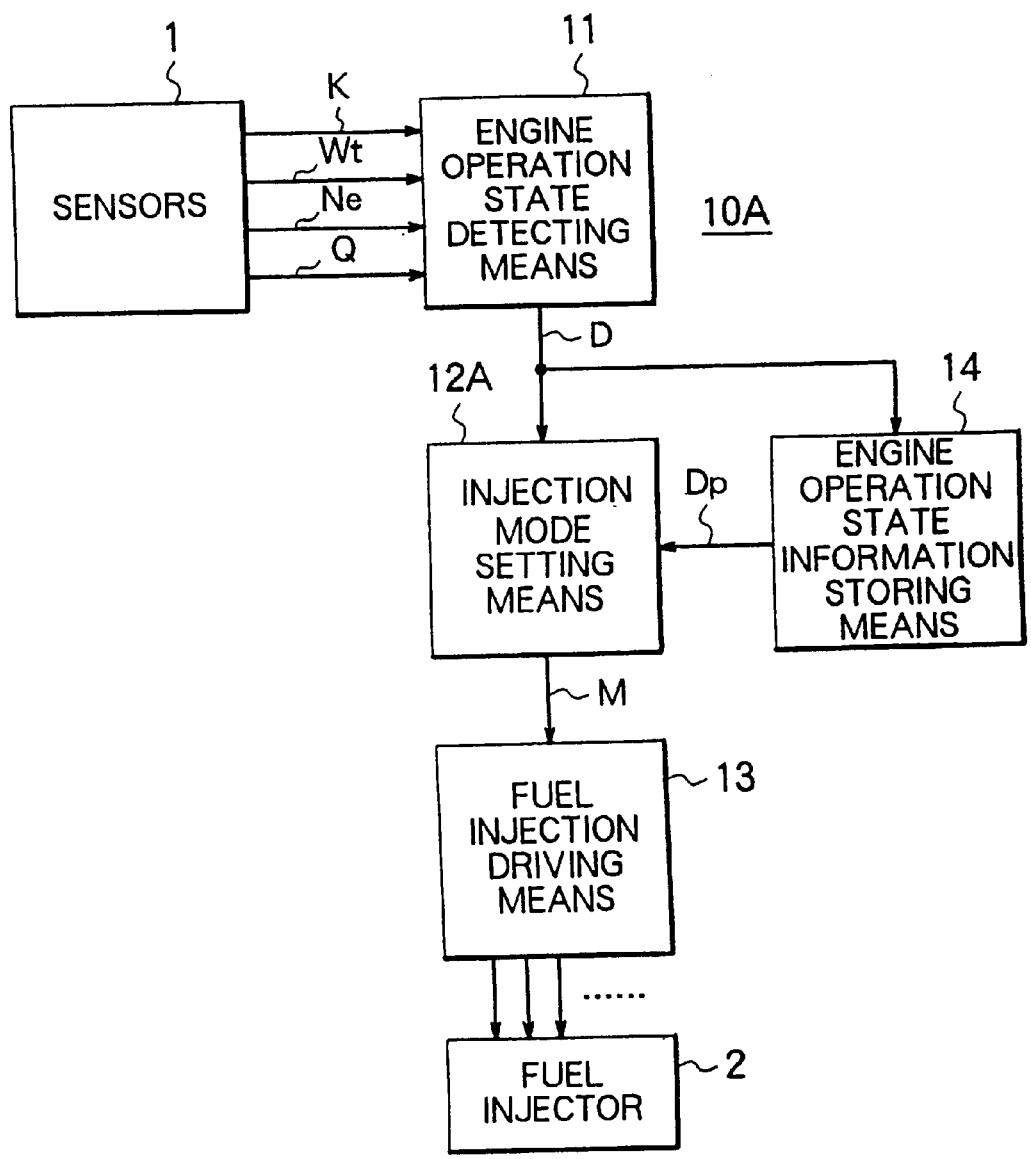
FIG. 1 is a block diagram showing schematically and generally a functional configuration of a fuel control system for a cylinder injection type internal combustion engine according to a first embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

FIG. 1 is a block diagram showing generally and schematically a functional configuration of the fuel control system for a cylinder injection type internal combustion engine according to a first embodiment of the present invention. In FIG. 1, same components as those mentioned hereinbefore are denoted by same reference characters, while the equivalent components are designated by same reference numerals affixed with A. Repeated description of these components will be omitted.

Referring to FIG. 1, an ECU (electronic control unit) 10A includes an engine operation state information storing means 14 for storing preceding engine operation state information Dp (i.e., information of the engine operation preceding to the current operation) as operation history information of the internal combustion engine.

The preceding engine operation state information Dp stored in the engine operation state information storing means 14 is inputted to an injection mode setting means 12A.

The injection mode setting means 12A is adapted for setting as the fuel injection mode selectively to the one-stroke fuel injection mode in which the fuel is injected during the compression or the suction stroke or alternatively the twostroke fuel injection mode in which the fuel is injected both in the compression stroke and the expansion stroke of the engine. To this end, the injection mode setting means 12A is so designed that unless the preceding engine operation state information Dp satisfies a predetermined condition in setting of the current fuel injection mode in succession to the engine starting operation, the two-stroke fuel injection is inhibited.

More specifically, unless the preceding engine operation state information Dp satisfies the predetermined condition indicating that the spark plug disposed within each of the relevant combustion chamber of the engine cylinder has been heated sufficiently in the preceding engine operation, the injection mode setting means 12A selects the one-stroke fuel injection, and if otherwise, the two-stroke fuel injection is selected to be validated.

In the case of the instant embodiment of the invention, it is assumed that the maximum value of the engine rotation number Ne is employed as the preceding engine operation state information Dp for making decision as to the predetermined condition mentioned above.

Figure 2:
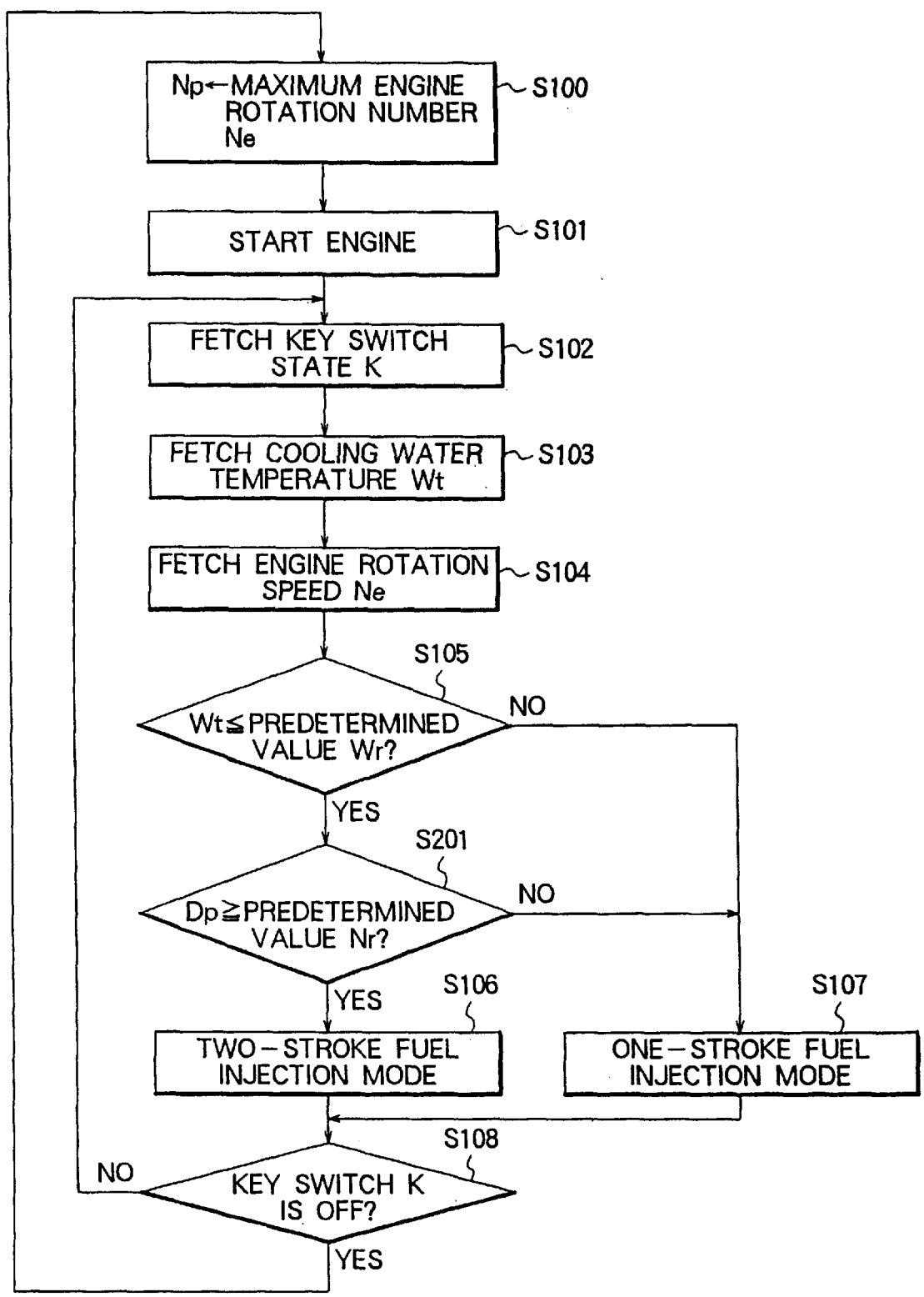
FIG. 2 is a flow chart for illustrating control operation of the fuel control system according to the first embodiment of the invention.
Figure 3:
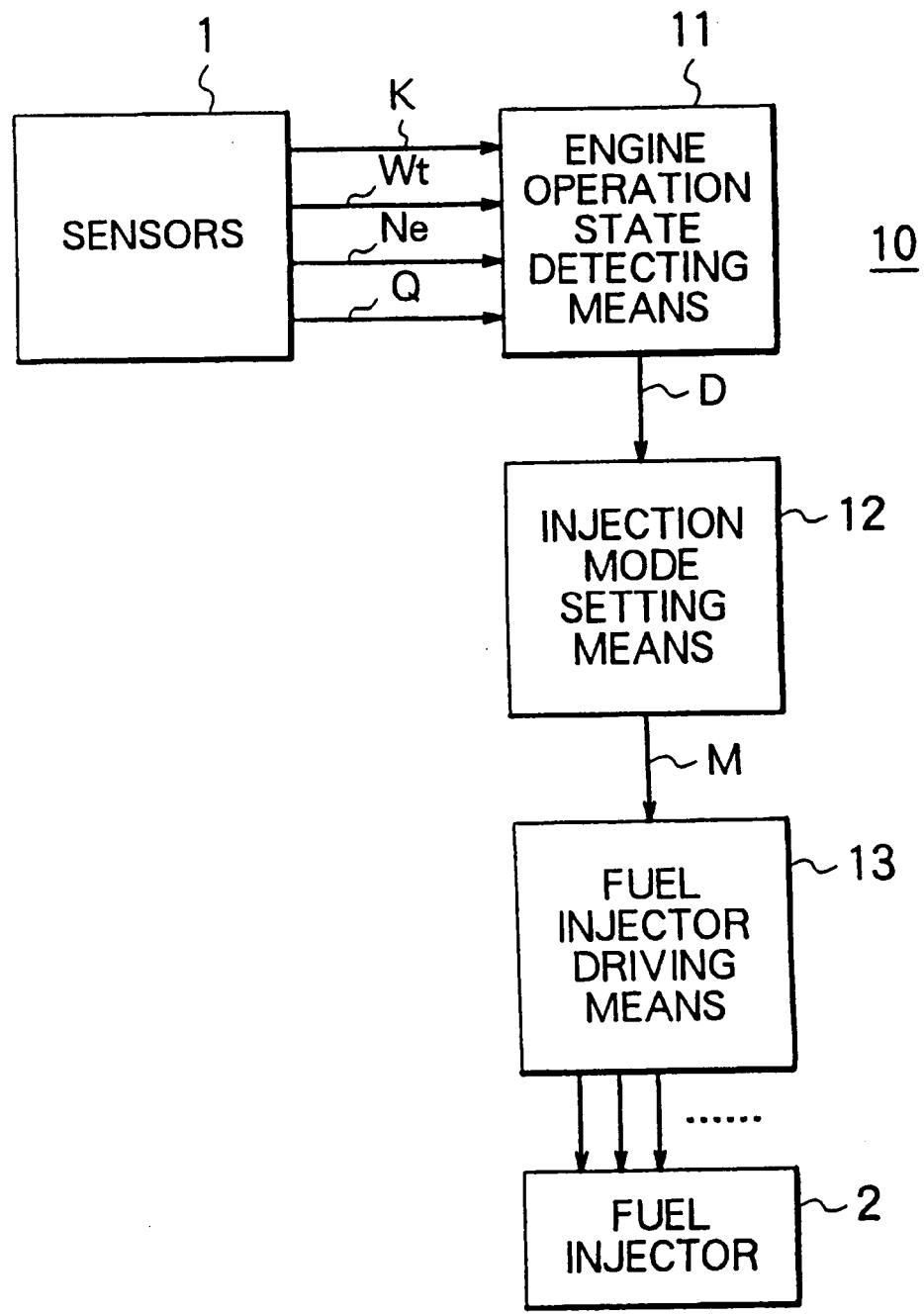
FIG. 3 is a block diagram showing schematically and generally a functional configuration of a conventional fuel control system for a cylinder injection type internal combustion engine known heretofore.

Next, referring to a flow chart shown in FIG. 2, description will be directed to the fuel injection control operation according to the invention incarnated in the instant embodiment of the invention.

Figure 4:
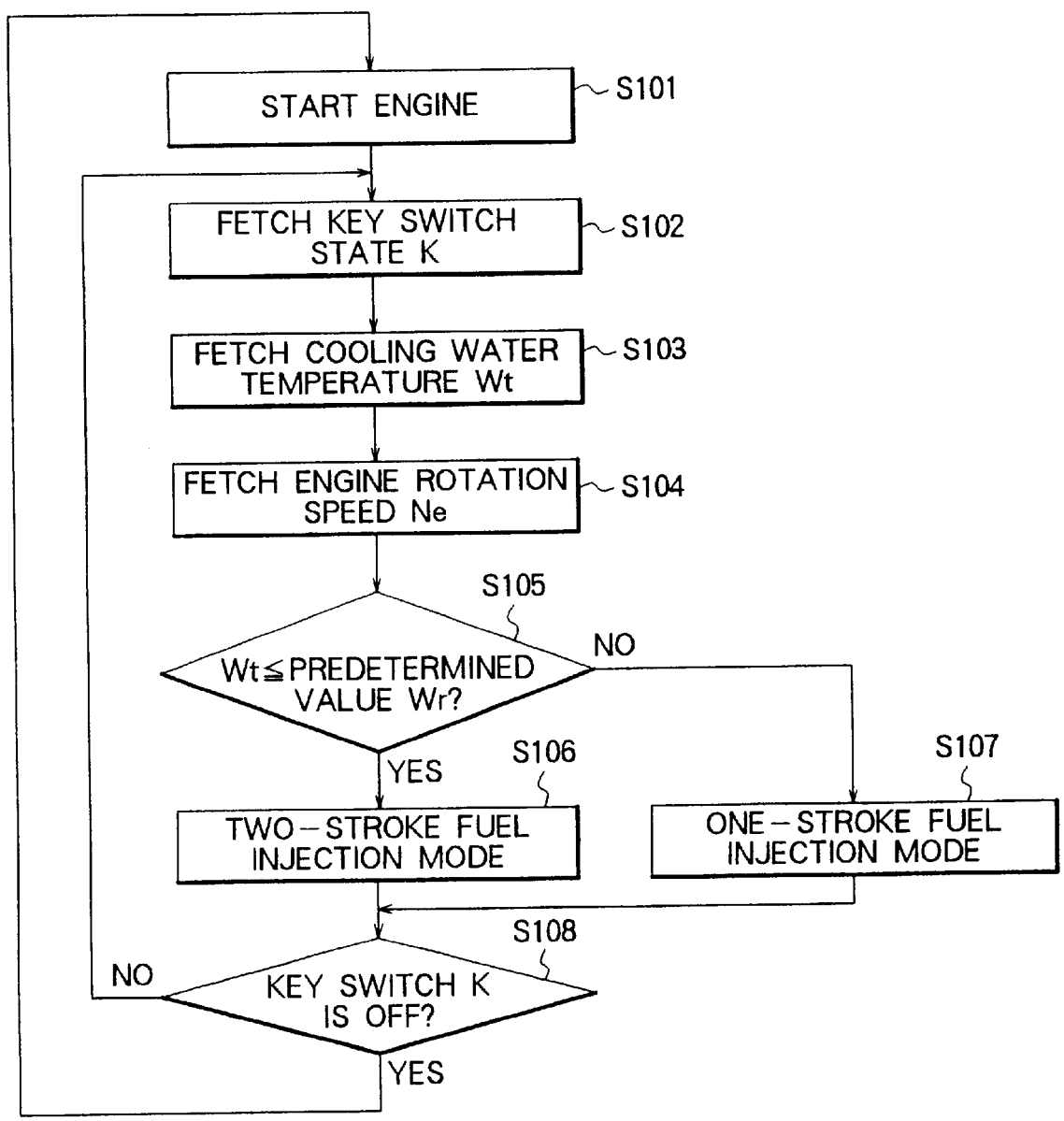
FIG. 4 is a flow chart for illustrating control operation of the conventional fuel control system.

Referring to FIG. 2, a step S100 corresponds to the operation of the engine operation state storing information means 14 while a step S201 corresponds to control operation of the injection mode setting means 12A. Parenthetically, the step S101 to S108 are similar to those described hereinbefore by reference to FIG. 4. Accordingly, repeated description in detail of these steps are omitted.

At first, in the step S100, the engine operation state information storing means 14 stores as a maximum engine rotation number Np the maximum value of the engine rotation number Ne (engine speed value) contained in the preceding engine operation state information Dp acquired before the current operation is started.

Subsequently, the engine operation state detecting means 11 inputs the various information such as the key switch on/off information K, the cooling water temperature Wt and the engine rotation number Ne in steps S101 to S104. The injection mode setting means 12A compares the cooling water temperature Wt with the predetermined value Wr in a step S105. When the cooling water temperature Wt exceeds the predetermined value Wr, the one-stroke fuel injection is selected in a step S107.

On the other hand, when it is decided in the step S105 that the cooling water temperature Wt is lower than the predetermined value Wr inclusive (i.e., when the decision step S105 results in affirmation "YES"), the injection mode setting means 12A compares the preceding maximum engine speed (rpm) Np stored in the engine operation state information storing means 14 with a predetermined value (rpm) Nr for thereby making decision as to whether or not the maximum engine speed Np exceeds the predetermined value Nr (step S201).

When it is decided in the step S201 that the maximum engine speed Np exceeds the predetermined value Nr (i.e., when the decision step S201 results in affirmation "YES"), the two-stroke fuel injection is selected (step S106). On the other hand, when it is decided that the maximum engine speed Np is lower than the predetermined value Nr (i.e., when the step S201 results in negation "NO"), the one-stroke fuel injection (i.e., the step S107) is selected.

In other words, when the maximum engine speed Np in the preceding engine operation is higher than the predetermined value Nr inclusive thereof, it is expected that the spark plug was heated sufficiently in the preceding engine operation. Accordingly, the possibility of contamination of the spark plug is extremely low nevertheless of the fuel injection during the expansion stroke in the two-stroke fuel injection mode in the preceding engine operation. Accordingly, the normal ignition state can be ensured even when the two-stroke fuel injection is selected as the current fuel injection mode M.

On the other hand, when it is decided that the maximum engine speed Np in the preceding engine operation is lower than the predetermined value Nr, it can be estimated that the spark plug was not sufficiently heated in the preceding engine operation and thus there exists a high possibility of the spark plug have been contaminated due to the two-stroke fuel injection in the preceding engine operation. Accordingly, if the two-stroke fuel injection is selected as the fuel injection mode M in the current engine operation, there arises high likelihood that the normal ignition can not be realized. Consequently, the one-stroke fuel injection is selected.

Parenthetically, it goes without saying that the predetermined value Nr is set to a value which can indicate with high reliability whether or not the spark plug was sufficiently heated.

Finally, in the step S108, it is decided whether the information K indicating the key switch being off is present or not. The routine including the steps S102 to S107 is repeated until the information K indicating the key switch being off is detected.

In this way, the engine operation state information storing means 14 monitors the engine rotation number Ne in the current engine operation until the key on/off switch information K indicates that the key switch is turned off.

If a decision is made in the step S108 that the information K indicating that the key switch is off is present (i.e., when the decision in the step S108 results in affirmation "YES"), the step S100 is resumed.

The engine operation state information storing means 14 stores as a new or updated value of the maximum engine speed Np the maximum value of the engine rotation number Ne detected before the key switch is turned off, as indicated by the information K.

The maximum engine speed Np updated in this way is employed for selecting the fuel injection mode M in the step S201 in the succeeding engine starting operation.

In this way, by storing the preceding engine operation state information Dp in the engine operation state information storing means 14 and inhibiting the two-stroke fuel injection in succession to the current starting operation when the maximum rotation number (maximum value of the engine rotation number Ne) contained in the preceding engine operation state information Dp does not satisfy the condition that it exceeds the predetermined value Nr inclusive)(i.e., unless the predetermined condition for the spark plug have been heated is met), it is possible to prevent an ignition abnormality (under the adverse influence exerted to the spark plug (such as deposition of uncombusted fuel and/or soot) ascribable to the two-stroke fuel injection.

As will now be understood from the foregoing, according to the invention incarnated in the instant embodiment, the two-stroke fuel injection is performed with the spark plug being always kept clean, whereby the normal ignition state can be maintained at all times. Furthermore, by selecting effectively the two-stroke fuel injection available for early activation of the catalytic medium, harmful gas components contained in the exhaust gas can be suppressed.

Embodiment 2

In the case of the first embodiment of the invention described above, the maximum engine speed Np is stored as a parameter for deciding the operation history of the engine on the basis of the preceding engine operation state information Dp. However, other parameter may be stored as the operation history information.

Equally in the case of the fuel control system according to the instant embodiment of the invention, unless the parameter value in the preceding engine operation satisfies a predetermined condition, selection of the two-stroke fuel injection is inhibited, whereby the effect similar to that in the case of the first embodiment can be achieved.

By way of example, a step (not shown) of storing the maximum value of the volumetric efficiency (corresponding to an output power of the engine) determined by the engine rotation number Ne and the intake air flow Q as the operation history information concerning the preceding engine operation state Dp in place of the step S100 shown in FIG. 2.

In that case, a step where the maximum value of the volumetric efficiency contained in the preceding engine operation state information Dp is compared with a predetermined value (a predetermined volumetric efficiency) is inserted in place of the step S201.

Thus, when the maximum value of the volumetric efficiency in the preceding engine operation is greater than the predetermined value inclusive, the two-stroke fuel injection (step S106) is selected in the current engine operation, whereas when the maximum value of the volumetric efficiency in the preceding engine operation is smaller than the predetermined value, the two-stroke fuel injection is inhibited with the one-stroke fuel injection (step S107) being selected.

The predetermined value mentioned above is set to a value indicating that the spark plug was sufficiently heated in the preceding engine operation.

The engine operation state information storing means 14 monitors the volumetric efficiency in the course of the current engine operation. At the time point when the key switch information K indicates that the key switch is turned off, the maximum value of the volumetric efficiency in the current operation is newly stored as the updated maximum value of the volumetric efficiency to be employed for the fuel injection control in the succeeding engine starting operation.

More specifically, decision is made as to whether a time duration of the engine operation enough to burn off the uncombusted fuel and soot deposited on the spark plug has lapsed or not. When this decision results in affirmation (indicating that the predetermined condition of engine operation has been met), the two-stroke fuel injection is enabled in the current engine starting operation. If otherwise, the one-stroke fuel injection is performed while invalidating the two-stroke fuel injection. In this manner, the two-stroke fuel injection is carried out in the clean state of the spark plug without deposition of fuel, soot or the like, whereby the normal ignition state can be ensured, as in the case of the first embodiment of the invention.

Embodiment 3

In the case of the fuel control system according to the first embodiment of the invention, the maximum value of the engine rotation number Ne is employed as the parameter to be referenced in making decision as to whether or not the spark plug was sufficiently heated in the preceding engine operation. According to another aspect of the invention, however, an accumulated value of the engine rotation number Ne (time-integral of the engine rotation number Ne) may be employed, substantially to the same effect.

Embodiment 4

In the case of the fuel control system according to the second embodiment of the invention, the maximum value of the volumetric efficiency is employed as the parameter to be referenced in making decision as to whether or not the spark plug was sufficiently heated in the preceding operation. According to another aspect of the invention, however, an accumulated value of the volumetric efficiency (time-integral of the volumetric efficiency) may be employed, substantially to the same effect.

Many modifications and variations of the present invention are possible in the light of the above techniques. It is therefore to be understood that within the scope of the appended claims, the invention may be practiced otherwise than as specifically described.

What is claimed is:

1. A fuel control system for a cylinder injection internal combustion engine having a spark plug disposed within a respective combustion chamber of an engine cylinder, said fuel control system comprising:

an electronic control device including:
 an engine operation state information device which stores preceding engine operation state information of said internal combustion engine with respect to a temperature of said spark plug disposed within said respective combustion chamber; and
 an injection mode setting device which sets a fuel injection mode selectively as one of a one-stroke fuel injection mode and a two-stroke fuel injection mode;
 wherein if said temperature of said spark plug is sufficiently heated to above a predetermined temperature in the preceding engine operation, the injection mode setting device selects the two-stroke fuel injection mode, and if said temperature of said spark plug is insufficiently heated below said predetermined temperature, the injection mode setting device selects the one-stroke fuel injection mode, whereby an ignition abnormality in which uncombusted material is deposited on said spark plug, ascribable to the two-stroke fuel injection mode when said spark plug is insufficiently heated, is prevented.

2. The fuel control system according to claim 1, wherein said predetermined temperature which is sufficient to heat said spark plug is determined using said information on said state of said preceding engine operation as to whether both a cooling water temperature is below a predetermined value inclusive and a value of a maximum engine speed is above a predetermined value inclusive.

3. A fuel control system for a cylinder injection internal combustion engine having a spark plug disposed within a respective combustion chamber of an engine cylinder, said fuel control system comprising:

an electronic control device including:
 an engine operation state information device which stores preceding engine operation state information of said internal combustion engine with respect to a cooling water temperature and an engine rotation number; and
 an injection mode setting device which sets a fuel injection mode selectively as one of a one-stroke fuel injection mode and a two-stroke fuel injection mode;
 wherein if said cooling water temperature is above a predetermined temperature, the injection mode setting device selects the one-stroke fuel injection mode, and if said cooling water temperature is below a predetermined temperature inclusive, said engine rotation number is determined; and
 wherein if said engine rotation number exceeds a predetermined value inclusive, the injection mode setting device selects the two-stroke fuel injection mode, and if said engine rotation number is below said predetermined value, the injection mode setting device selects the one-stroke fuel injection mode.

4. A fuel control system for a cylinder injection internal combustion engine having a spark plug disposed within a respective combustion chamber of an engine cylinder, said fuel control system comprising:

an electronic control device including:
 an engine operation state information device which stores preceding engine operation state information of said internal combustion engine with respect to a temperature of said spark plug disposed within said respective combustion chamber; and
 an injection mode setting device which sets a fuel injection mode selectively as one of a one-stroke fuel injection mode and a two-stroke fuel injection mode;
 wherein if said temperature of said spark plug is sufficiently heated to above a predetermined temperature in the preceding engine operation, the injection mode setting device selects the two-stroke fuel injection mode, and if said temperature of said spark plug is insufficiently heated below said predetermined temperature, the injection mode setting device selects the one-stroke fuel injection mode; and wherein if said spark plug is not sufficiently heated above said predetermined temperature, the two-stroke fuel injection mode is inhibited from being used, and an ignition abnormality whereby uncombusted material is deposited on said spark plug, ascribable to the two-stroke fuel injection mode when said spark plug is insufficiently heated, is prevented.

5. The fuel control system according to claim 4, wherein said predetermined temperature is sufficient to heat said spark plug is determined using said information on said state of said preceding engine operation as to whether a maximum value of an engine rotation number in the preceding engine operation is greater than a predetermined value inclusive.

6. The fuel control system according to claim 4, wherein said predetermined temperature is sufficient to heat said spark plug is determined using said information on said state of said preceding engine operation as to whether a maximum value of a volumetric efficiency in the preceding engine operation is greater than a predetermined value inclusive.

7. The fuel control system according to claim 4, wherein said predetermined temperature is sufficient to heat said spark plug is determined using said information on said state of said preceding engine operation as to whether an accumulated value of an engine rotation number is greater than a predetermined value inclusive.

8. The fuel control system according to claim 4, wherein said predetermined temperature is sufficient to heat said spark plug is determined using said information on said state of said preceding engine operation as to whether an accumulated value of a volumetric efficiency in the preceding engine operation is greater than a predetermined value inclusive.

9. A method for controlling a fuel system for a cylinder injection internal combustion engine having a spark plug disposed within a respective combustion chamber of an engine cylinder, said fuel control method comprising the steps of:

detecting an engine operation state of said internal combustion engine, including a cooling water temperature and an engine rotation number;

storing information on said engine operation state as preceding engine operation state information of said internal combustion engine;

determining if said cooling water temperature is lower than a predetermined temperature inclusive;

wherein if said cooling water temperature is greater than said predetermined temperature, a one-stroke fuel injection mode is used, and, wherein if said cooling water temperature is lower than said predetermined temperature, then determining whether said engine rotation number is greater than a predetermined number inclusive;

wherein if said engine rotation number is greater than a predetermined number inclusive, a two-stroke fuel injection mode is used, and if said engine rotation number is lower than a predetermined number, using a one-stroke fuel injection mode, such that an ignition abnormality is prevented.

10. The fuel control method of claim 9, further comprising the step of inhibiting the two-stroke fuel injection mode from being validated when the engine rotation number is lower than said predetermined number.

11. The fuel control method of claim 9, wherein said engine rotation number is a maximum rotation number.

12. The fuel control method of claim 9, wherein a volumetric efficiency is detected during said step of detecting an engine operation state of said internal combustion engine, and said volumetric efficiency replaces said engine rotation number in said determining step to determine if said volumetric efficiency is greater than a predetermined number inclusive.

13. The fuel control method of claim 9, wherein a volumetric efficiency is detected during said step of detecting an engine operation state of said internal combustion engine, and an accumulated value of said volumetric efficiency replaces said engine rotation number in said determining step to determine if said accumulated value of said volumetric efficiency is greater than a predetermined number inclusive.

14. The fuel control method of claim 9, wherein an accumulated value of said engine rotation number replaces said engine rotation number in said determining step to determine if said accumulated value of said rotation number is greater than a predetermined number inclusive.

* * * * *